Dec. 5, 1944.   W. C. HANSON   2,364,290
BEARING
Filed March 1, 1943   2 Sheets-Sheet 1
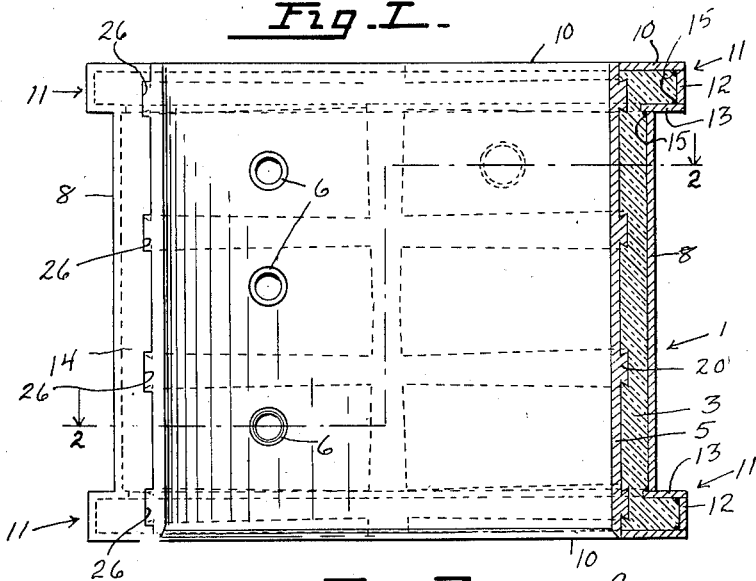
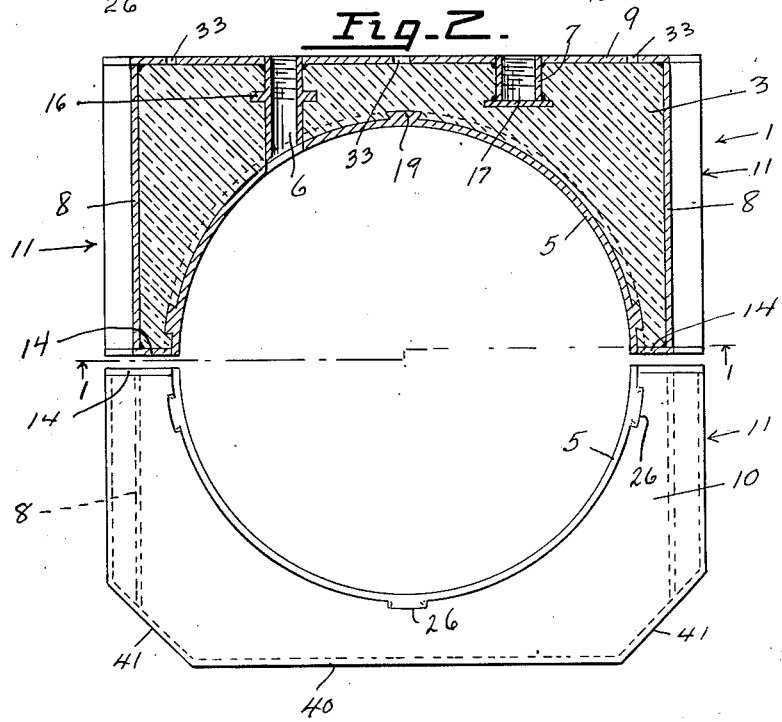
INVENTOR.
WALTER C. HANSON
BY
Boyken, Mohler & Beckley
ATTORNEYS.

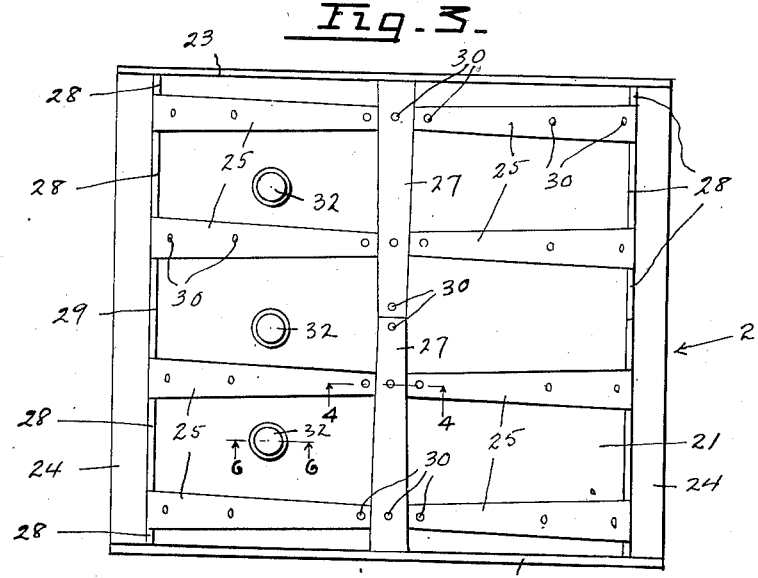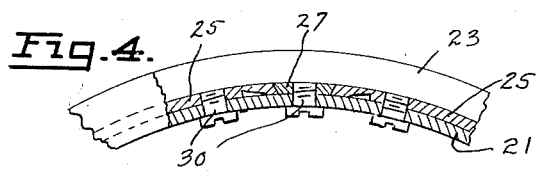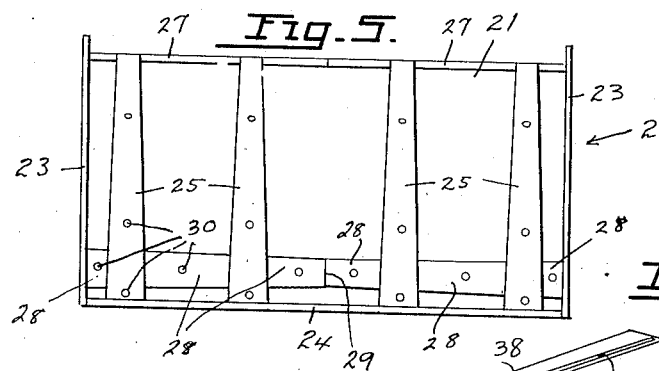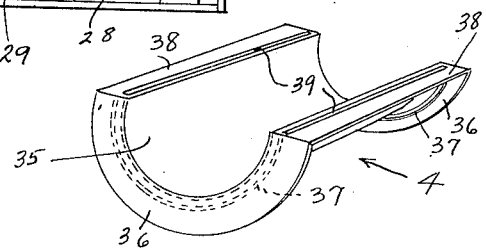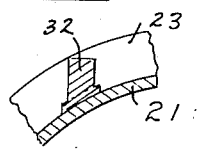

Patented Dec. 5, 1944

2,364,290

UNITED STATES PATENT OFFICE 2,364,290

BEARING

Walter C. Hanson, Berkeley, Calif.

Application March 1, 1943, Serial No. 477,552

6 Claims. (Cl. 308—237)

This invention relates to bearings and to castings to be used where they are not subjected to shock or to torsional or bending strains.

Objects of the invention are the provision of improved bearings adapted to fulfill all of the requirements of conventional relatively heavy, solid metal bearings, but which improved bearings are very much lighter in weight and much cheaper to make than such conventional bearings. Also the bearings of this invention require only a fraction of the metal heretofore employed without sacrifice in size and shape and efficiency, and which improved bearings may be substituted for conventional bearing blocks in bearing boxes, caps or bases.

Another object is an improved method of making bearings, castings, and the like, where the same are not subjected to direct shocks or blows, or to appreciable torsional and bending strains.

Other objects and advantages will appear in the description and drawings.

In the drawings, Fig. 1 is a part sectional, part plan view of a bearing block as taken along line 1—1 of Fig. 2.

Fig. 2 is a sectional view of the bearing block of Fig. 1 taken along line 2—2 of Fig. 1, and which view also shows in end elevation the lower block of the bearing in a position slightly spaced below the upper block.

Fig. 3 is a plan view of the convex side of a mold form used in forming the block of Fig. 1.

Fig. 4 is a fragmentary enlarged part sectional and part elevational view taken along line 4—4 of Fig. 3.

Fig. 5 is a side elevational view of the mold form of Fig. 4.

Fig. 6 is an enlarged, fragmentary sectional view taken along line 6—6 of Fig. 3.

Fig. 7 is a reduced size perspective view of a mold form for use in lining a bearing block with bearing metal, such as Babbitt, etc.

Method used

The steps in making a bearing such as is shown in Fig. 1 comprises first making an outer metal shell 1 that has a higher melting point than that of slag or impure glass. Iron or steel is suitable. This shell has an open side with the free edges defining the outline of such open side being of the desired contour. In the shells used to form the bearing blocks of Fig. 2 the free edges of one pair of opposed ends of the shell of each block are semi-circularly curved to generally correspond to the cylindrical contour of the shaft to be supported between the blocks.

A closure is adapted to be removably secured over the open side of the shell of each block sealed with respect to the side and end walls of each shell thereby closing the shell. In Fig. 3 a closure generally designated 2 is shown for one or the other of the shells of Fig. 2.

After the closure is in position on the shell, the latter is filled with slag 3 or impure molten glass through suitable openings in the shell, and as soon as the slag solidifies the closure is removed.

Any desired projections, such as strips of dovetail cross-section, may be removably secured to the side of the closure that faces into the shell, whereby the slag that engages the closure will have recesses formed therein corresponding to the contours of such projections.

Where such projections are used, the main body of the closure may be disconnected from the projections upon its removal from the shell, and the projections may then be removed from the slag or glass leaving the desired recesses in the exposed surface of the slag.

The next step comprises positioning another closure, such as is designated A (Fig. 7) over the open side of the slag-filled shell, but slightly spaced from the exposed surface of the slag. This closure also is in sealing engagement with the sides and ends of the shell, and the bearing metal, such as is indicated at 5 in Fig. 2, is then poured into the space between the closure 4 and the slag 3. After this metal, such as babbitt, is solidified, the closure 4 is removed. The metal 5 will, of course, fill the recesses that were previously formed in the exposed side of the slag, and where such recesses are under-cut at their sides, the babbitt will be keyed to the slag by reason of that portion of the metal that has flowed into the recesses.

In forming bearing blocks, the closures 2, 4 will be of semi-cylindrical contour so as to generally conform to the linear contour of two opposed ends of the shell 1 so that the final layer of babbitt will substantially conform in contour to that of the shaft that is to be supported between the blocks, such as are shown in Fig. 2. This babbitt or bearing metal may then be reamed to the exact desired fit for the shaft and conventional oil grooves may be also formed in the metal for distribution along the portion of the shaft that is to be supported in the bearing.

The general steps of the method itself are not restricted to the forming of bearings, since the shells may be boxes having walls defining a chamber of the desired contour filled with slag that is substantially integrally united with the metal by use of any one of the conventional fluxes. Such boxes or forms may be employed for machine bases, or in any place where there is no impact of a character that would break the slag. The walls of the boxes or forms function to enclose and to reinforce the slag, yet the slag supplies all the solidity required for the purpose for which it is to be used. Thus, the method may be employed to form bearings and other elements as a substitute for present castings.

When it is considered that the weight of slag or glass per cubic foot is about 160 lbs. as compared with the weight of about 440 lbs. per cubic foot for cast iron, it will be seen that where the maximum volume of iron in a casting is replaced by glass, the resultant casting will be much lighter, and in the making of bearings, the costs of labor and material are reduced to a relatively small fraction of that required for making conventional bearings.

*The bearing structure illustrated*

Referring more specifically to the bearing blocks of this invention, one type of which is shown in the drawings, the shell 1 of each block comprises opposed side walls 8, a top wall 9 (or bottom wall, according to which block is uppermost) and end walls 10. The shell may have rib-like projections 11 on the sides adjacent the corners that are adapted to fit slidably in complementally formed grooves or recesses in the conventional bearing box, cap or base (not shown) as the case may be. These projections may be formed from a strip 12 of sheet metal spaced outwardly of the plane of the side wall 8 adjacent thereto, and which strip is secured to side wall 8 by a strip 13 that is in a plane at right angles to side 8, while the end plates 10 that form the ends of the shell extend between the free edges of the strips 12 at each end and are secured to such strips in any suitable manner such as by welding. Such welding is preferably along the inner surfaces of the shell, as is indicated at 15 in Fig. 1.

End plates 10 are welded at one of their edges to the straight end edges of top 9, and their opposite edges are cut to the same semi-circular contour slightly greater than the radius of the shaft, the difference being substantially equal to the thickness of the layer of babbitt that is to be used, as will later be described.

In the bottom block of a set of bearing blocks there is generally no need for oil ducts, but in the top block, such ducts are preferably formed by securing metal tubes 6 in holes formed in top wall 9, and which tubes may be flanged as at 16 for anchoring them in the slag that is to fill the shell. These tubes 6 project into the shell and terminate at their inner ends almost to the single semi-cylindrical plane in which the aligned curved edges of end plates 10 are disposed.

Another relatively short tube 7 may also be secured in an opening in top plate 9, which tube may be closed at its end within the shell by a flange plate 17. One of the tubes 6 and the tube 7 may be internally threaded at its end that opens outwardly of top 9 for convenience in securing conventional threaded externally lifting elements thereon for lifting the block from the box or cap in which it is adapted to be positioned (Fig. 2).

A strip 14 along the free edges of each side 8 extends over projections 11 and extends inwardly from said edges to the terminating ends of the semicircular edges of plates 10 and is welded at its ends to said end plates 10 and to sides 8 as well as to the corner strips 12, 13. The shape of said strips 14 corresponds at its ends to the rectangular contour of the corner pieces 11.

Slag or impure glass 3 fills the shell 1 to the curved semi-circular edges of plates 10 and to the strips 14, side walls 8 and top 9. The exposed surface of this slag extending between the curved edges of plates 10 is semi-cylindrical in contour and is formed with elongated recesses at right angles to each other and opening into each other at their intersections. These recesses open outwardly from the concave surface of the slag and are of equal depth with their sides undercut to provide dove-tail like contours for keying a layer of bearing material 5 to the slag as is indicated at 19 in Fig. 2 and 20 in Fig. 1.

The closure 2 (Figs. 3, 5) for closing the open side of the shell 1 during the filling of the shell with slag comprises a semi-cylindrical plate 21 that fits at its ends on the curved edges of plates 10. This plate 21 has flanges 23 that may slidably engage the outwardly facing sides of plates 10, and flanges 24 fit over strips 14. Clamps (not shown) may clamp the flanges 24 against strips 14 to tightly hold the plate 21 in position.

On the convex side of plate 21, which side is adapted to face into shell 1, is a pair of rows of metal strips 25 removably secured to said plate. These strips 25 extend in direction circumferentially of the plate 21 and one of the ends of the strips of each row are adjacent flanges 24 and said ends are adapted to extend into notches or recesses 26 (Fig. 1) in the adjacent edges of strips 14 when the flanges 24 are against said strips.

The strips 25 have their longitudinally extending edges beveled to extend divergently from the sides thereof that are adjacent plate 21, while linearly, said edges extend convergently from the flanges 24 toward a center line on plate 21, extending between the curved ends of the latter. The inner or adjacent ends of said strips 25 abut the opposite edges of strips 27 that extend at right angles to strips 25 and on said center line.

The strips 27 extend from flanges 23 to a point midway between said flanges and their longitudinally extending edges are beveled similar to the above mentioned edges of strips 27, while linearly said edges are convergent from flanges 23 to said central point where the strips 27 abut at their adjacent ends.

Along each of the flanges 24, but spaced from the edges of plate 21 with which said flanges are connected, are relatively short strips 28 that extend between each of the adjacent pairs of strips 25, and between the end strips 25 and flanges 23.

Strips 28 are in lines parallel with strips 27 and the only difference between them and said latter strips is that they fit between strips 25. Their corresponding edges are convergent in direction inwardly of flanges 23 to a central point 29 between the central pair of strips 2, and said edges are beveled like the edges of strips 27.

Screws 30 extend through plate 21 from its concave side and threadedly engage in openings in strips 25, 27 and 28 to releasably secure said strips to the convex side of said plate. These screws are unscrewed from said concave side to release the plate 21 from the strips.

It is pertinent to note that the curved semi-circular edges of end plates 10 are also notched or recessed at 26, the same as the edges of strips 14 for receiving the ends of strips 27, 28 (lower block in Fig. 2).

Cylindrical projections 32 may also be secured to the convex side of plate 21 for fitting in the open ends of the tubes 6 that are secured on top 9 (Figs. 3, 6) when plate 21 is positioned over the open side of shell 1.

The top plate 9 may be provided with several openings 33 through one or more of which the slag may be poured into shell 1 when the closure 2 (plate 21, etc.) closes the open side of said shell. These openings may be as large as necessary to accomplish the filling step, and irrespective of whether the bearing block is an upper or a lower one, it is preferable that the plate 9 be uppermost during the filling of the shell with slag or the like. The strips 25, 27 and 28 and convex surface of plate 21 may be painted with any conventional anti-glass sticking compound if desired, while the inner surfaces of shell 1 may be coated with a flux to insure cohesion between the shell and glass, although this step is not absolutely essential.

After the shell 1 is filled with molten slag or impure glass and the latter has solidified sufficiently to be self sustaining as to its shape, the screws 30 are loosened from the strips 25, 27 and 28 and the clamps (not shown) securing the plate 21 to the shell are removed. The plate 21, together with the flanges carried thereon, may then be removed from the shell leaving the strips 25, 27 and 28 in the slag. These strips are then driven out of the slag through the notches 26, leaving outwardly opening recesses in the concave side of the slag corresponding to the thickness, length and cross-sectional contours of the strips.

The closure 4 (Fig. 7) is then positioned over the exposed concave side of the slag, which closure comprises a plate 35 curved so that its convex side will substantially correspond to the concave surface of the layer bearing metal 5 that is to be poured in place. Flanges 36 at the ends of plate 35 may be provided with asbestos sealing strips 37 that will form a seal with the outer sides of end plates 10 of the bearing block along the bottoms of recesses 26 in said plates. Also flanges 38 along the straight edges of the plate 35 are adapted to engage strips 14 for clamping against said strips in the same manner as flanges 24 of closure 2 were clamped thereto. These flanges 38 also serve to space the convex side of plate 35 a uniform distance from the exposed concave surface of slag 3 equal to the desired thickness of bearing metal 5.

The bearing metal is then poured into the space between the slag and plate 35 through slots 39 that are adjacent the free opposed edges of plates 14.

After the babbitt or bearing metal has cooled sufficiently to be self sustaining, the closure 4 (that includes plate 35 and its flanges) is removed and the metal 5 is keyed to the slag as at 19 (Fig. 2) as well as in the recesses formed by strips 25.

The plate 35 may also be provided with projections like the projections 32 (Fig. 3) to fit in the tubes 6, so that the bearing metal will not enter the tubes.

The exposed concave surface of the bearing metal is spaced from the edges of strips 14 and from the curved edges of plates 10. This surface may be reamed to fit the shaft that is intended to be supported by the bearing blocks if found necessary, and the portion thereof adjacent one of the end plates may be curved for a crank clearance if a crank is on the shaft, which curved surface of metal 5 is seen in Fig. 1.

Also conventional oil grooves may be formed in the bearing metal 5 if desired.

The foregoing description is specifically directed to one bearing block, or to the upper half. In Fig. 2 is an end view of the lower bearing of a set, and which block is identical with the upper half of the set and identically positioned parts are numbered the same as those of the upper bearing wherever shown.

It will be seen that the bottom plate 40 (corresponding generally to top plate 9), is formed with angularly positioned marginal portions 41 that meet sides 2 at their free edges. This shape is merely to enable the block to fit the standard box or base portion of the box in which the lower block is adapted to fit. In some instances the lower block is identical with the upper one, except for the tubes 6 and short tube 7, which are ordinarily not used in the lower block of a set.

Various modifications may be made in the shape of the shells 1 to conform to the external contour required for different installations, and it is obvious that removable cores may be employed instead of pipes 6, although the latter are preferable. The drawings are not intended to be restrictive of the invention, but are merely illustrative.

The bearings illustrated eliminate the following steps now required: cutting dove-tail grooves for bearing metal; the cost and time of roughing the castings now used; the present need for milling the outside surfaces and for boring and facing the babbitt; the planing of channels and drilling and tapping of oil holes and holes for lifting tools.

Having described my invention, I claim:

1. A bearing block for a shaft comprising a body of slag the contour of one outer side of which substantially conforms to the cylindrical contour of the shaft to be supported by the body; key-ways formed in said one outer side of said body, a liner of bearing metal filling said key-ways and covering said one outer side of said body, and a metal-lined duct for oil extending through said body and liner and opening outwardly of opposite sides of said body at its opposite ends.

2. A bearing block for a shaft comprising a body of slag having a concavely formed outer side conforming generally to a portion of the cylindrical contour of such shaft, a liner of bearing metal covering said portion and secured to said block, a metal shell in which said block is secured with said liner being exposed for supporting such shaft when the block is in position for use.

3. A bearing block for a shaft comprising a body of slag having a concavely formed outer side conforming generally to a portion of the cylindrical contour of such shaft, a liner of bearing metal covering said portion and secured to said block, a metal shell in which said block is secured with said liner being exposed for supporting such shaft when the block is in position for use, said shell being formed to provide rib-like portions projecting therefrom for engagement in the complementally formed portion of a bearing box in which the said block is to be secured.

4. A bearing block for a shaft comprising a body of slag having a concavely formed outer side conforming generally to a portion of the cylindrical contour of such shaft, a liner of bearing metal covering said portion and secured to said block, a metal shell in which said block is secured with said liner being exposed for supporting such shaft when the block is in position for use, said shell including a pair of opposed end walls terminating in curved free edges corresponding in linear contour to the curvature of said concavely formed cylindrical contour of said one outer side of said body, and said curved free edges being concentric with the axis about which said cylindrical contour is developed, and said liner extending over said free edges.

5. A bearing block for a shaft comprising a body of slag having a concavely formed outer side conforming generally to a portion of the cylindrical contour of such shaft, a liner of bearing metal covering said portion and secured to said block, a metal shell in which said block is secured with said liner being exposed for supporting such shaft when the block is in position for use; means carried by said shell so securing said body in said shell against removal therefrom.

6. A bearing block for a shaft comprising a body of slag having a concavely formed outer side conforming generally to a portion of the cylindrical contour of such shaft, a liner of bearing metal covering said portion and secured to said block, a metal shell in which said block is secured with said liner being exposed for supporting such shaft when the block is in position for use, a plurality of metal tubes secured at one of their ends to one of the metal walls of said shell and projecting into said shell, said tubes opening outwardly of the metal shell at one of their ends and opening through said liner at their opposite ends for conducting oil to the exposed surface of said liner.

WALTER C. HANSON.